(12) United States Patent
Wu (10) Patent No.: US 10,530,534 B2
(45) Date of Patent: Jan. 7, 2020

(54) DEVICE AND METHOD OF HANDLING HYBRID AUTOMATIC REPEAT REQUEST TIMING

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/378,473

(22) Filed: Apr. 8, 2019

(65) Prior Publication Data

US 2019/0238276 A1 Aug. 1, 2019

Related U.S. Application Data

(62) Division of application No. 15/674,507, filed on Aug. 10, 2017.

(Continued)

(51) Int. Cl.
*H04L 1/18* (2006.01)
*H04W 84/04* (2009.01)
*H04W 88/08* (2009.01)

(52) U.S. Cl.
CPC .......... *H04L 1/1812* (2013.01); *H04L 1/1822* (2013.01); *H04L 1/1854* (2013.01);
(Continued)

(58) Field of Classification Search
CPC ... H04L 1/1812; H04L 1/1864; H04L 1/1854; H04L 1/1822; H04W 88/08; H04W 84/042
See application file for complete search history.

(56) References Cited

U.S. PATENT DOCUMENTS

2014/0376421 A1* 12/2014 Yang .................. H04L 5/14
370/280
2016/0119840 A1* 4/2016 Loehr ............... H04W 72/0446
370/331
(Continued)

FOREIGN PATENT DOCUMENTS

EP 3043502 A1 7/2016
TW 201215026 A1 4/2012
(Continued)

OTHER PUBLICATIONS

ETSI TS 136 213 V13.2.0, Aug. 2016.
(Continued)

*Primary Examiner* — Marcus Hammonds
(74) *Attorney, Agent, or Firm* — Winston Hsu (57) ABSTRACT

A base station comprised in a network for handling a Hybrid Automatic Repeat Request (HARQ) timing for a communication device comprises a storage device storing instructions and the processing circuit configured to execute the instructions of communicating with the communication device according to a first HARQ minimum timing; receiving a first message comprising an indication of support of a second HARQ minimum timing from the communication device according to the first HARQ minimum timing, wherein the first HARQ minimum timing is greater than the second HARQ minimum timing; transmitting a second message configuring the second HARQ minimum timing to the communication device according to the first HARQ minimum timing in response to the first message; and communicating with the communication device according to the second HARQ minimum timing, when configuring the second HARQ minimum timing to the communication device.

10 Claims, 6 Drawing Sheets

Related U.S. Application Data (60) Provisional application No. 62/373,947, filed on Aug. 11, 2016.

(52) U.S. Cl.
CPC ......... *H04L 1/1864* (2013.01); *H04W 84/042* (2013.01); *H04W 88/08* (2013.01)

(56) References Cited

U.S. PATENT DOCUMENTS

| | | | |
|---|---|---|---|
| 2016/0205540 A1* | 7/2016 | Wu | H04L 1/1854 370/329 |
| 2017/0117992 A1* | 4/2017 | Frederiksen | H04W 72/04 |
| 2017/0223670 A1* | 8/2017 | Chen | H04L 5/0053 |
| 2017/0288819 A1* | 10/2017 | Chen | H04L 1/1854 |
| 2017/0290008 A1* | 10/2017 | Tooher | H04L 1/0007 |
| 2018/0020335 A1* | 1/2018 | Yin | H04N 21/41407 |
| 2018/0034597 A1* | 2/2018 | Uchino | H04W 16/32 |
| 2018/0206232 A1* | 7/2018 | Takeda | H04W 28/04 |

FOREIGN PATENT DOCUMENTS

| | | |
|---|---|---|
| TW | 201342842 A | 10/2013 |
| TW | 201408029 A | 2/2014 |
| TW | 201503630 A | 1/2015 |
| WO | 2015/149862 A1 | 10/2015 |

OTHER PUBLICATIONS

Search Report dated Dec. 1, 2017 for EP application No. 17185758.4, pp. 1-4.

Office action dated Aug. 9, 2018 for the Taiwan application No. 106127374, filing date Aug. 11, 2017, p. 1-5.

* cited by examiner

DEVICE AND METHOD OF HANDLING HYBRID AUTOMATIC REPEAT REQUEST TIMING

CROSS REFERENCE TO RELATED APPLICATIONS

This application is a divisional application of U.S. application Ser. No. 15/674,507, filed on Aug. 10, 2017, which claims the benefit of U.S. Provisional Application No. 62/373,947, filed on Aug. 11, 2016.

BACKGROUND OF THE INVENTION

1. Field of the Invention

The present invention relates to a communication device and a method used in a wireless communication system, and more particularly, to a communication device and a method of handling a Hybrid Automatic Repeat Request (HARQ) timing in a wireless communication system.

2. Description of the Prior Art

An evolution of a long-term evolution (LTE) system is continued to provide a high data rate and a low latency. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway (S-GW), etc., for Non-Access Stratum (NAS) control.

SUMMARY OF THE INVENTION

The present invention therefore provides a communication device and method for handling a Hybrid Automatic Repeat Request (HARQ) timing in a wireless communication system to solve the abovementioned problem.

A base station (BS) comprised in a network for handling a HARQ timing for a communication device comprises a storage device and a processing circuit coupled to the storage device. The storage device stores instructions, and the processing circuit is configured to execute the instructions of communicating with the communication device according to a first HARQ minimum timing; receiving a first message comprising an indication of support of a second HARQ minimum timing from the communication device according to the first HARQ minimum timing, wherein the first HARQ minimum timing is greater than the second HARQ minimum timing; transmitting a second message configuring the second HARQ minimum timing to the communication device according to the first HARQ minimum timing in response to the first message; and communicating with the communication device according to the second HARQ minimum timing, when configuring the second HARQ minimum timing to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
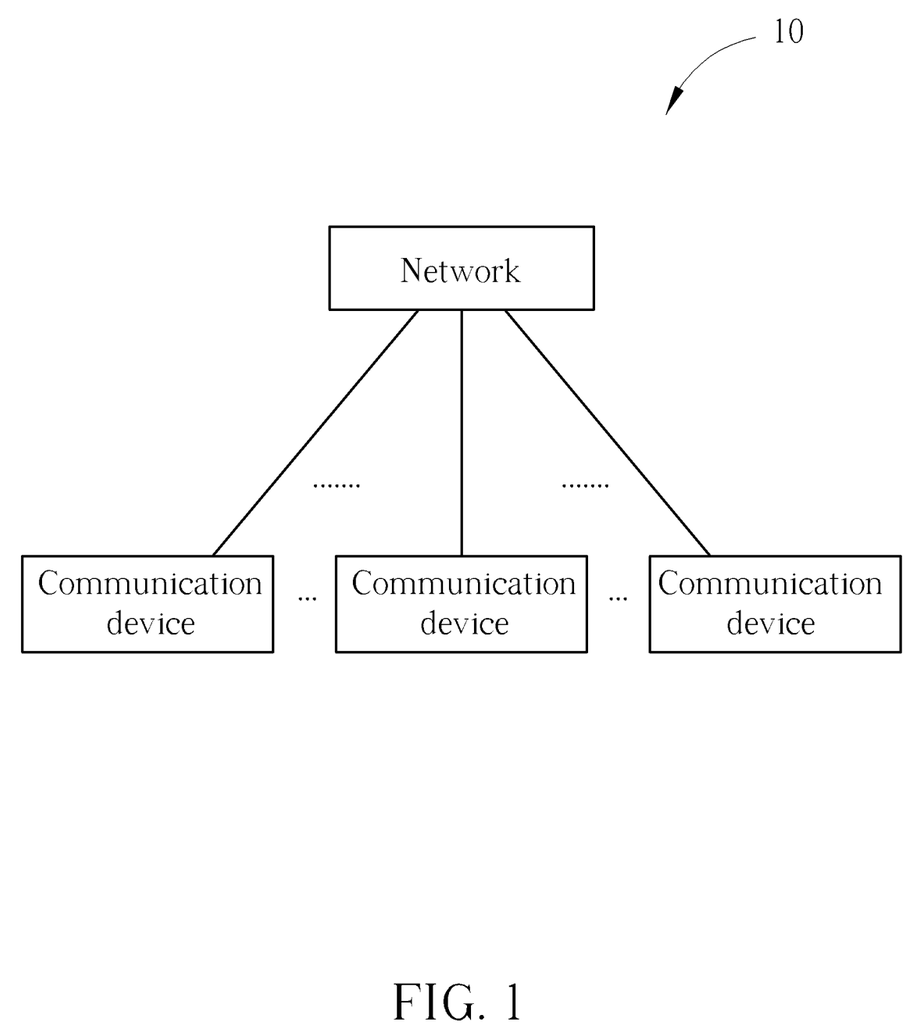
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) including at least one Node-B (NB) and/or a Radio Network Controller (RNC) in a universal mobile telecommunications system (UMTS). In one example, the network may include an evolved universal terrestrial radio access network (E-UTRAN) comprising at least one evolved NB (eNB). In one example, the network may include a fifth generation (5G) network including at least one 5G base station (BS) (e.g. gNB) which employs orthogonal frequency-division multiplexing (OFDM) and/or non-OFDM, wide bandwidth (e.g., 100 MHz) and transmission time interval smaller than 1 millisecond (ms) (e.g., 100 or 200 microseconds), to communication with the communication devices. In general, a BS may also be used to refer to the eNB or the 5G BS.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
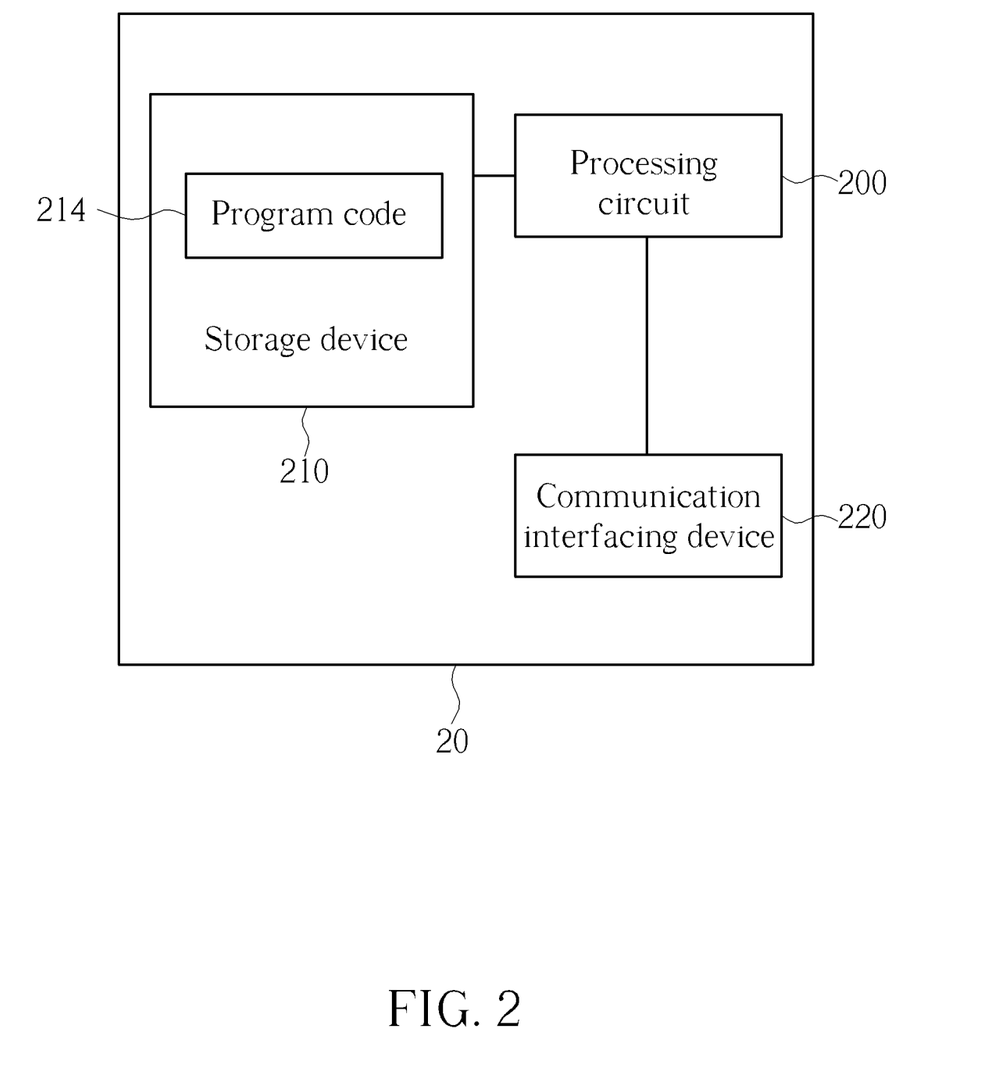
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes a transceiver transmitting and receiving signals (e.g., data, signals, messages and/or packets) according to processing results of the processing circuit 200.

In the following embodiments, a UE is used to represent a communication device in FIG. 1, to simplify the illustration of the embodiments.

Figure 3:
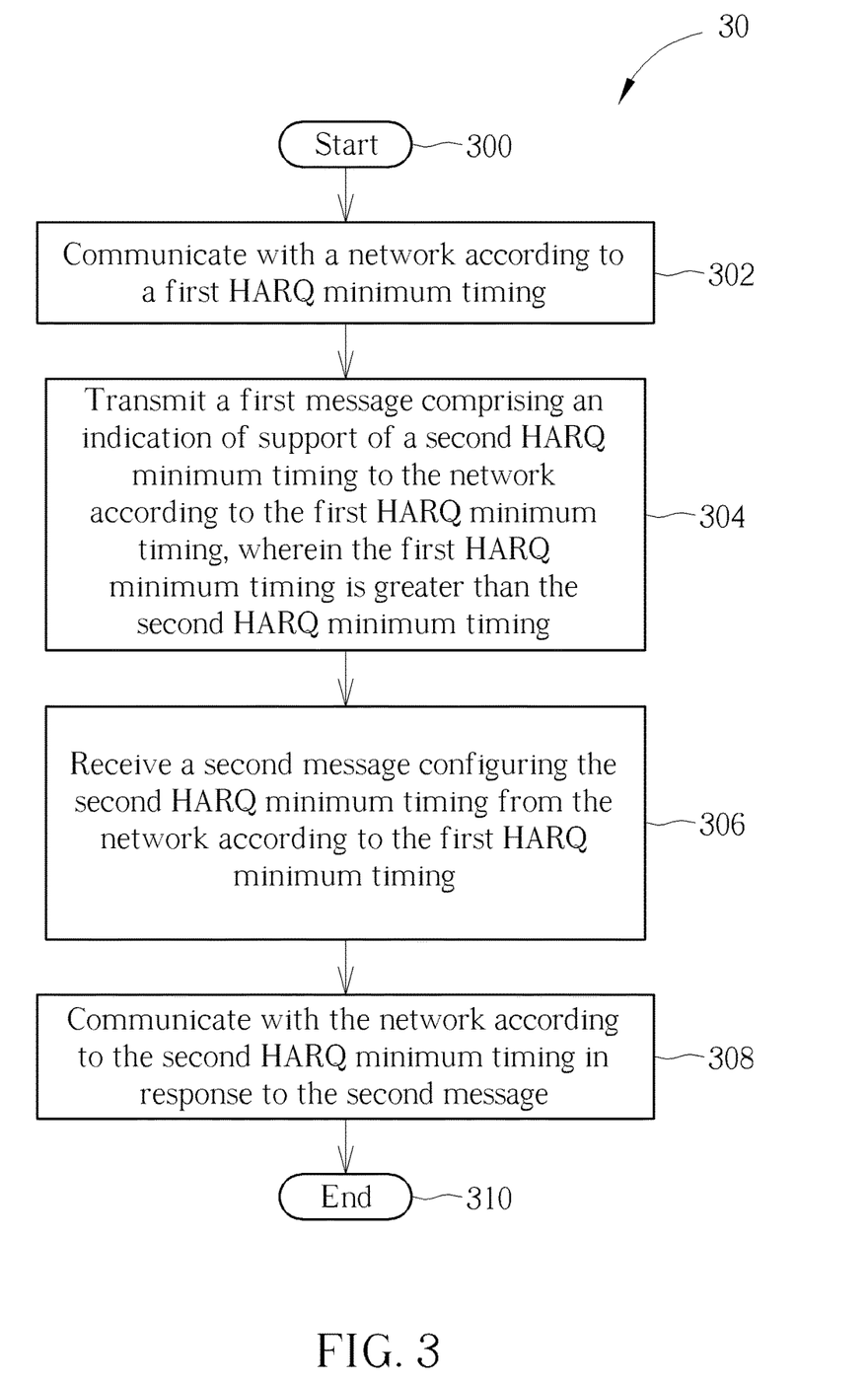
FIG. 3 is a flowchart of a process according to an example of the present invention.

FIG. 3 is a flowchart of a process 30 according to an example of the present invention. The process 30 is utilized in a UE, to handling a Hybrid Automatic Repeat Request (HARQ) timing and includes the following steps:

Step 300: Start.

Step 302: Communicate with a network according to a first HARQ minimum timing.

Step 304: Transmit a first message comprising an indication of support of a second HARQ minimum timing to the network according to the first HARQ minimum timing, wherein the first HARQ minimum timing is greater than the second HARQ minimum timing.

Step 306: Receive a second message configuring the second HARQ minimum timing from the network according to the first HARQ minimum timing.

Step 308: Communicate with the network according to the second HARQ minimum timing in response to the second message.

Step 310: End.

According to the process 30, the UE and the network synchronize with each other according to the reduced HARQ minimum timing (e.g., the second HARQ minimum timing).

Realization of the process 30 is not limited to the above description. The following examples may be applied to the process 30.

In one example, the UE establishes a radio resource control (RRC) connection with the network, when communicating with the network according to the first HARQ minimum timing. Then, the UE transmits the first message via the RRC connection to the network.

In one example, the indication of the support of the second HARQ minimum timing is applied for a plurality of component carriers (CCs) in a carrier aggregation (CA) or a dual connectivity (DC). In one example, the indication of the support of the second HARQ minimum timing is applied for UL CCs or DL CCs in the CA or the DC. In one example, the indication of the support of the second HARQ minimum timing is specific to a CC. In one example, the indication of the support of the second HARQ minimum timing is specific to a UL, a DL or both the UL and the DL.

In one example, the first HARQ minimum timing may be a first interval between a first transmission time interval (TTI) (e.g., n-th TTI) in which the UE receives a first UL grant from the network and a second TTI (e.g., (n+k)-th TTI) in which the UE transmits first UL data according to the first UL grant to the network. The second HARQ minimum timing may be a second interval between a third TTI (e.g., m-th TTI) in which the UE receives a second UL grant from the network and a fourth TTI (e.g., (m+k')-th TTI) in which the UE transmits second UL data according to the second UL grant to the network. For example, k (e.g., k=4) is greater than k' (e.g., k'=2 or 3). In one example, the UE may receive the first UL grant in a first DL control information (DCI) with a first cyclic redundancy check (CRC) scrambled with a Cell Radio Network Temporary Identifier (C-RNTI) of the UE on a first physical DL control channel (PDCCH) or a first enhanced PDCCH (EPDCCH) (hereafter, a PDCCH refers a PDCCH or an EPDCCH). The UE may receive the second UL grant in a second DCI with a second CRC scrambled with the C-RNTI of the UE on a second PDCCH. In one example, formats of the first DCI and the second DCI are the same or different.

In one example, the first HARQ minimum timing may be a first interval between a first TTI (e.g., a-th TTI) in which the UE transmits first UL data according to a first HARQ process and a first UL grant to the network and a second TTI (e.g., (a+j)-th TTI) in which the UE receives a first HARQ feedback indicating whether the first UL data is received or not or in which the UE receives a second UL grant from the network. The second HARQ minimum timing may be a second interval between a third TTI (e.g., b-th TTI) in which the UE transmits second UL data according to a second HARQ process and a third UL grant to the network and a fourth TTI (e.g., (b+j')-th TTI) in which the UE receives a second HARQ feedback indicating whether the second UL data is received or not or in which the UE receives a fourth UL grant from the network. For example, j (e.g., j=4) is greater than j' (e.g., j'=2 or 3). In one example, the UE may receive the first UL grant in a first DCI with a first CRC scrambled with a first C-RNTI of the UE on a first PDCCH. The UE may receive the second UL grant in a second DCI with a second CRC scrambled with the first C-RNTI of the UE on a second PDCCH, wherein formats of the first DCI and the second DCI are the same. The UE may receive the first HARQ feedback on a physical hybrid-ARQ indicator channel (PHICH). The UE may receive the third UL grant in a third DCI with a third CRC scrambled with a second C-RNTI of the UE on a third PDCCH. The UE may receive the fourth UL grant in a fourth DCI with a fourth CRC scrambled with the second C-RNTI of the UE on a fourth PDCCH. In one example, the first C-RNTI and the second C-RNTI are the same, and formats of the third DCI and the fourth DCI are the same but different form the formats of the first DCI and the second DCI. In another example, the first C-RNTI and the second C-RNTI are different, and formats of the third DCI and the fourth DCI are the same as the formats of the first DCI and the second DCI.

In one example, the first HARQ minimum timing may be a first interval between a first TTI (e.g., c-th TTI) in which the UE intends to receive first DL data according to a first DL assignment from the network and a second TTI (e.g., (c+i)-th TTI) in which the UE transmits a first HARQ feedback indicating whether the first DL data is received or not to the network. The second HARQ minimum timing may be a second interval between a third TTI (e.g., d-th TTI) in which the UE intends to receive second DL data according to a second DL assignment from the network and a fourth TTI (e.g., (d+i')-th TTI) in which the UE transmits a second HARQ feedback indicating whether the second DL data is received or not to the network. For example, i (e.g., i=4) is greater than i' (e.g., i'=2 or 3). In one example, the UE may receive the first DL assignment in a first DCI with a first CRC scrambled with a first C-RNTI of the UE on a first PDCCH. The UE may receive the second DL assignment in a second DCI with a second CRC scrambled with a second C-RNTI of the UE on a second PDCCH. The first C-RNTI and the second C-RNTI are the same or different. Formats of the first DCI and the second DCI are the same or different. In one example, the first C-RNTI and the second C-RNTI are the same, and the formats of the first DCI and the second DCI are different. In another example, the first C-RNTI and the second C-RNTI are different, and the formats of the first DCI and the second DCI are the same.

In one example, the first HARQ minimum timing may be a first interval between a first TTI (e.g., e-th TTI) in which the UE transmits a first HARQ feedback indicating whether first DL data is received or not to the network and a second TTI (e.g., (e+q)-th TTI) in which the UE receives a first DL assignment from the network. The second HARQ minimum timing may be a second interval between a third TTI (e.g., f-th TTI) in which the UE transmits a second HARQ feedback indicating whether second DL data is received or not to the network and a fourth TTI (e.g., (f+q')-th TTI) in which the UE receives a second DL assignment from the network. For example, q (e.g., q=4) is greater than q' (e.g., q'=2 or 3). In one example, the UE may receive the first DL assignment in a first DCI with a first CRC scrambled with a first C-RNTI of the UE on a first PDCCH. The UE may receive the second DL assignment in a second DCI with a second CRC scrambled with a second C-RNTI of the UE on a second PDCCH. The first C-RNTI and the second C-RNTI are the same or different. Formats of the first DCI and the second DCI are the same or different. In one example, the first C-RNTI and the second C-RNTI are the same, and the formats of the first DCI and the second DCI are different. In another example, the first C-RNTI and the second C-RNTI are different, and the formats of the first DCI and the second DCI are the same.

In one example, k, j, i and q may be a same value or different values.

In one example, the UE may not communicate with the network according to the first HARQ minimum timing, i.e., the UE may not use the first HARQ minimum timing anymore, when the UE is configured to communicate with the network according to the second HARQ minimum timing.

In one example, the UE may communicate with the network according to at least one of the first HARQ minimum timing and the second HARQ minimum timing, when the UE is configured to communicate with the network according to the second HARQ minimum timing. For example, when the UE is configured to communicate with the network according to the second HARQ minimum timing, the UE uses the first HARQ minimum timing or the second HARQ minimum timing according to a DCI or a C-RNTI. The DCI and the C-RNTI can be referred to the previous description, and are not narrated herein. The UE may monitor a PDCCH with the DCI indicating the second HARQ minimum timing or may monitor a PDCCH with the C-RNTI indicating the second HARQ minimum timing, when the UE is configured to communicate with the network according to the second HARQ minimum timing.

In one example, the UE may communicate with the network according to the first HARQ minimum timing on a first CC. The UE may communicate with the network according to the second HARQ minimum timing on a second CC.

In one example, the UE may perform a random access (RA) procedure triggered by one of a UL transmission (e.g., transmission of buffer status report or scheduling request), a PDCCH order which is received from the network and a handover command, when the UE is configured to communicate with the network according to the second HARQ minimum timing. In one example, the UE transmits a RA preamble of the RA procedure to the network, and receives a RA response from the network in a RA response window. For example, the UE transmits the RA preamble to the network. The UE receives a first RA response in x-th TTI from the network in response to the RA preamble, wherein the first RA response includes a first UL grant (e.g., the random access response grant). The UE transmits first UL data in (x+y)-th TTI, wherein y is greater than or equals to 6, if a UL delay field in the first UL grant is set to 0, where the (x+y)-th TTI is a first available UL TTI for a physical UL shared channel (PUSCH) transmission. For a FDD serving cell of the network, y equals to 6. For a time-division duplexing (TDD) serving cell of the network, the first available UL TTI for transmitting the first UL data is determined based on a UL/DL configuration (e.g., the parameter subframeAssignment). The UE postpones the transmission of the first UL data to the next available UL TTI after the (x+y)-th TTI, if the UL delay field is set to 1. After the UE transmits the first UL data in the (x+y)-th TTI or the next available UL TTI after the (x+y)-th TTI, the UE receives a first HARQ feedback or a DCI (indicating a retransmission of the first UL data) on a PDCCH according to the first HARQ minimum timing (e.g., in (x+y+4)-th TTI).

In one example, the network (e.g., always) transmits the DCI in the first HARQ minimum timing, wherein the DCI indicates a retransmission of UL data which was transmitted by a UE according to a UL grant in a RA response, no matter the UE supports or is configured the second HARQ minimum timing.

In one example, the first message may be a Medium Access Control (MAC) control element or a RRC message (e.g., UECapabilityInformation). The second message may be a MAC control element or a RRC message (e.g., RRC-ConnectionReconfiguration). In one example, the support of the second HARQ minimum timing is included in a UE-EUTRA-Capability information element.

Figure 4:
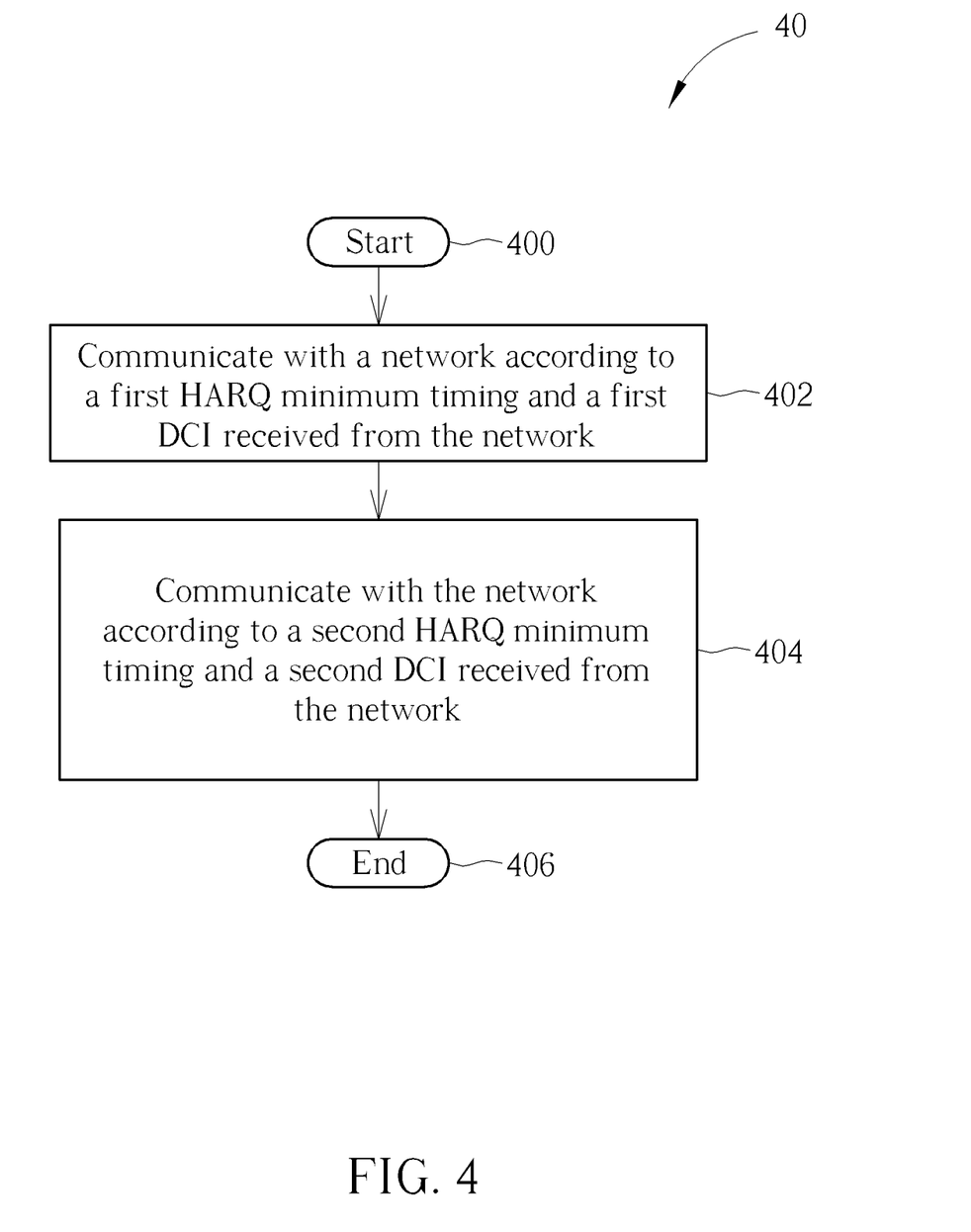
FIG. 4 is a flowchart of a process according to an example of the present invention.

FIG. 4 is a flowchart of a process 40 according to an example of the present invention. The process 40 is utilized in a UE, to handle a HARQ timing and includes the following steps:

Step 400: Start.

Step 402: Communicate with a network according to a first HARQ minimum timing and a first DCI received from the network.

Step 404: Communicate with the network according to a second HARQ minimum timing and a second DCI received from the network.

Step 406: End.

In one example, the first DCI is configured with a first CRC scrambled by a C-RNTI of the UE, and the second DCI is configured with a second CRC scrambled by the C-RNTI of the UE. The formats of the first DCI and the second DCI are same or different.

Realization of the process 40 is not limited to the above description. The following examples may be applied to the process 40.

In one example, the UE may communicate (e.g., transmit or receive) with the network on a first CC according to the first HARQ minimum timing, a first HARQ process and the first DCI (e.g., the first DCI includes a first UL grant or a first DL assignment). The UE may communicate (e.g., transmit or receive) with the network on the first CC or a second CC according to the second HARQ minimum timing, a second HARQ process and the second DCI (e.g., the second DCI includes a second UL grant or a second DL assignment). The first DCI and the second DCI can be referred to the previous description related to the process 30, and are not narrated herein.

In one example, the network transmits the second DCI on the first CC or the second CC to the UE, after the network receives a message comprising an indication of support of the second HARQ minimum timing. In one example, the network transmits the first DCI on the first CC to the UE, after the network receives a message comprising an indication of support of the second HARQ minimum timing, which can be referred to the previous description and is not narrated herein.

Figure 5:
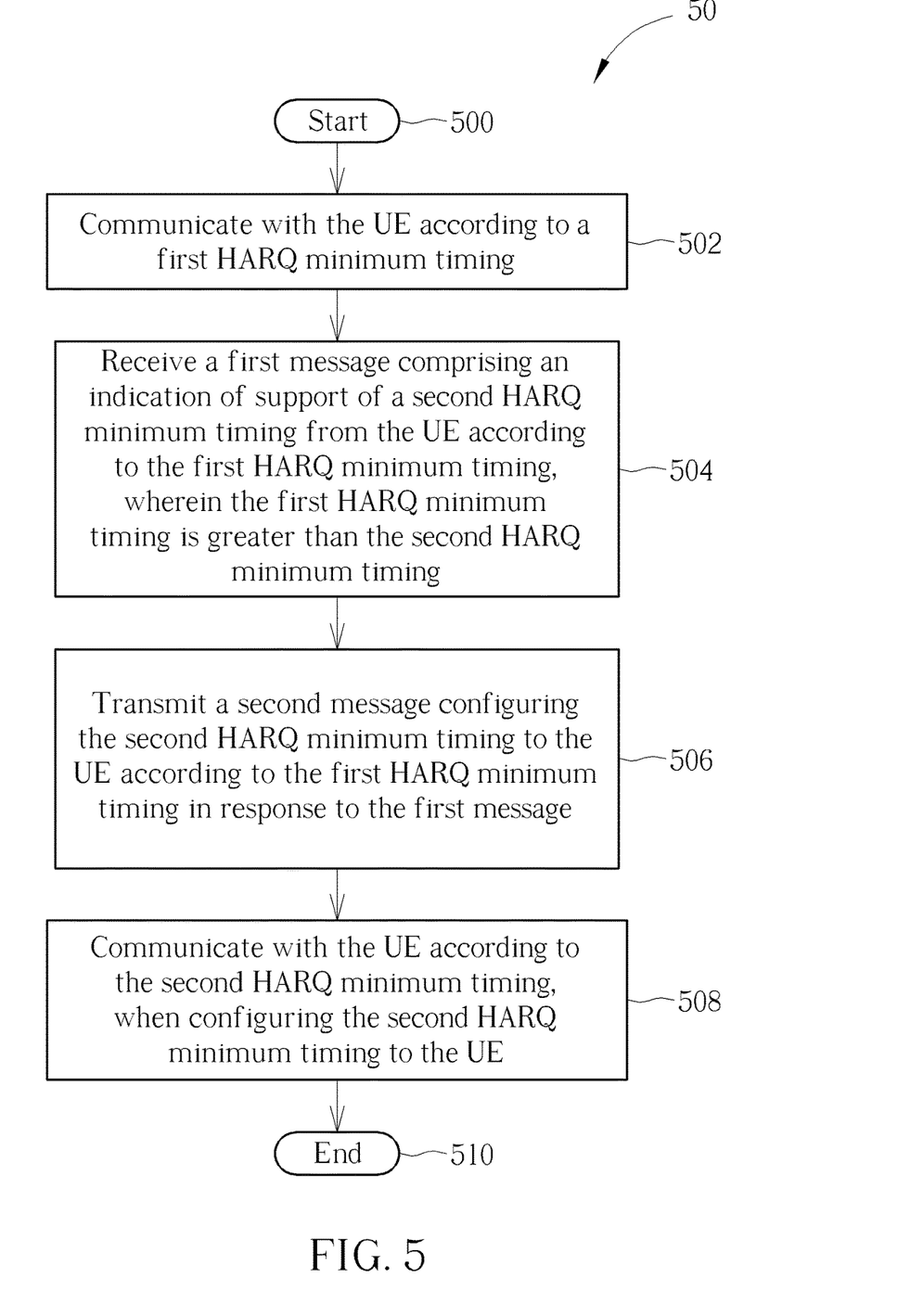
FIG. 5 is a flowchart of a process according to an example of the present invention.

FIG. 5 is a flowchart of a process 50 according to an example of the present invention. The process 50 is utilized in a BS included in a network, to handle a HARQ timing for a UE and includes the following steps:

Step 500: Start.

Step 502: Communicate with the UE according to a first HARQ minimum timing.

Step 504: Receive a first message comprising an indication of support of a second HARQ minimum timing from the UE according to the first HARQ minimum timing, wherein the first HARQ minimum timing is greater than the second HARQ minimum timing.

Step 506: Transmit a second message configuring the second HARQ minimum timing to the UE according to the first HARQ transmission timing in response to the first message.

Step 508: Communicate with the UE according to the second HARQ transmission timing, when configuring the second HARQ transmission timing to the UE.

Step 510: End.

According to the process 50, the UE and the network synchronize with each other according to the reduced HARQ minimum timing (e.g., the second HARQ minimum timing).

Realization of the process 50 is not limited to the above description. The examples for the process 50 can be referred to the previous description related to the process 30, and are not narrated herein.

Figure 6:
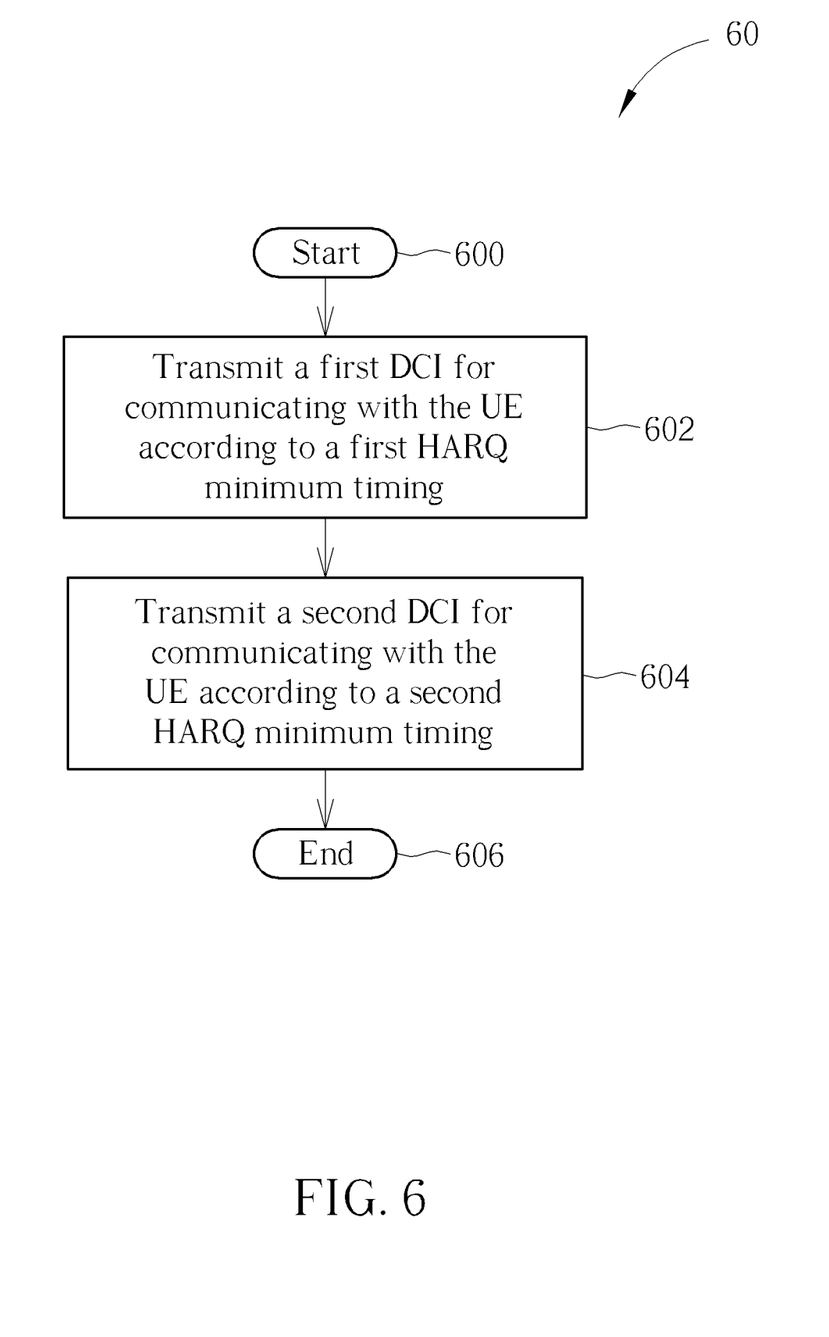
FIG. 6 is a flowchart of a process according to an example of the present invention.

FIG. 6 is a flowchart of a process 60 according to an example of the present invention. The process 60 is utilized in a BS included in a network, to handle a HARQ timing for a UE and includes the following steps:

Step 600: Start.

Step 602: Transmit a first DCI for communicating with the UE according to a first HARQ minimum timing.

Step 604: Transmit a second DCI for communicating with the UE according to a second HARQ minimum timing.

Step 606: End.

The following examples may be applied to the processes 30-60.

In one example, the first HARQ minimum timing is longer than the second HARQ minim timing.

In one example, the network may transmit the first DCI and the second DCI, after receiving a message comprising an indication of support of the second HARQ minimum timing. The network may transmit a first HARQ feedback corresponding to a first PUSCH transmission received from the UE according to the first HARQ minimum timing and a second HARQ feedback corresponding to a second PUSCH transmission received from the UE according to the second HARQ minimum timing, when the network knows that the UE supports the second HARQ minimum timing or before or after the network configures the second HARQ minimum timing. The UE may transmit a PUSCH transmission according to a UL grant included in a RA response or in the first DCI according to the first HARQ minimum timing.

In one example, the UE starts a first HARQ round-trip time (RTT) timer for a first HARQ process, wherein the first HARQ process is used for communicating with the network according to the first HARQ minimum timing. The UE starts a second HARQ RTT timer for a second HARQ process, wherein the second HARQ process is used for communicating with the network according to the second HARQ minimum timing, wherein a first length (e.g., 8 TTIs) of the first HARQ RTT timer is longer than a second length (e.g., 6 or 4 TTIs) of the second HARQ RTT timer. In one example, the first HARQ process and the second HARQ process are DL HARQ processes, and the first HARQ RTT timer and the second HARQ RTT timer are DL HARQ RTT timers. In one example, the first HARQ process and the second HARQ process are UL HARQ processes, and the first HARQ RTT timer and the second HARQ RTT timer are UL HARQ RTT timers.

In one example, the network starts a first HARQ RTT timer for a first HARQ process, wherein the first HARQ process is used for communicating with the UE according to the first HARQ minimum timing. The network starts a second HARQ RTT timer for a second HARQ process, wherein the second HARQ process is used for communicating with the UE according to the second HARQ minimum timing, wherein a first length (e.g., 8 TTIs) of the first HARQ RTT timer is longer than a second length (e.g., 6 or 4 TTIs) of the second HARQ RTT timer. In one example, the first HARQ process and the second HARQ process are DL HARQ processes, and the first HARQ RTT timer and the second HARQ RTT timer are DL HARQ RTT timers. In one example, the first HARQ process and the second HARQ process are UL HARQ processes, and the first HARQ RTT timer and the second HARQ RTT timer are UL HARQ RTT timers.

Each UL data may be transmitted by the UE in a HARQ transmission or a PUSCH transmission in a TTI, and each DL data may be transmitted by the BS in a HARQ transmission or a physical DL shared channel (PDSCH) transmission in a TTI. The HARQ feedback may be a HARQ acknowledgement (ACK) or a negative acknowledgement (NACK). The TTI may be 1 ms or 0.5 ms.

In one example, a field in the DCI above may indicate that the first HARQ minimum timing or the second HARQ minimum timing is used.

Furthermore, the examples in the processes 30-50 may be applied to the process 60, and are not narrated herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above mentioned processes may be compiled into the program code 214.

To sum up, the present invention provides a communication device and a method for handling a HARQ timing for a network including at least one BS. The UE transmits a message to notify the network which reduced HARQ minimum timing is supported. Thus, the problem how the UE and the network synchronize with each other according to the reduced HARQ minimum timing is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station (BS) comprised in a network for handling a Hybrid Automatic Repeat Request (HARQ) timing for a communication device, comprising:
   a storage device; and
   a processing circuit, coupled to the storage device, wherein the storage device stores instructions, and the processing circuit is configured to execute the instructions of:
   communicating with the communication device according to a first HARQ minimum timing;

receiving a first message comprising an indication of support of a second HARQ minimum timing from the communication device according to the first HARQ minimum timing, wherein the first HARQ minimum timing is greater than the second HARQ minimum timing;

transmitting a second message configuring the second HARQ minimum timing to the communication device according to the first HARQ minimum timing in response to the first message; and communicating with the communication device according to the second HARQ minimum timing, when configuring the second HARQ minimum timing to the communication device.

2. The BS of claim 1, wherein the first HARQ minimum timing is a first interval between a first transmission time interval (TTI) in which the communication device receives a first uplink (UL) grant from the network and a second TTI in which the communication device transmits first UL data according to the first UL grant to the network, and the second HARQ minimum timing is a second interval between a third TTI in which the communication device receives a second UL grant from the network and a fourth TTI in which the communication device transmits second UL data according to the second UL grant to the network.

3. The BS of claim 1, wherein the first HARQ minimum timing is a first interval between a first TTI in which the communication device transmits first UL data according to a first HARQ process and a first UL grant to the network and a second TTI in which the communication device receives a first HARQ feedback indicating whether the first UL data is received or not or in which the communication device receives a second UL grant from the network, and the second HARQ minimum timing is a second interval between a third TTI in which the communication device transmits second UL data according to a second HARQ process and a third UL grant to the network and a fourth TTI in which the communication device receives a second HARQ feedback indicating whether the second UL data is received or not or in which the communication device receives a fourth UL grant from the network.

4. The BS of claim 1, wherein the first HARQ minimum timing is a first interval between a first TTI in which the communication device intends to receive first downlink (DL) data according to a first DL assignment from the network and a second TTI in which the communication device transmits a first HARQ feedback indicating whether the first DL data is received or not to the network, and the second HARQ minimum timing is a second interval between a third TTI in which the communication device intends to receive second DL data according to a second DL assignment from the network and a fourth TTI in which the communication device transmits a second HARQ feedback indicating whether the second DL data is received or not to the network.

5. The BS of claim 1, wherein the first HARQ minimum timing is a first interval between a first TTI in which the communication device transmits a first HARQ feedback indicating whether first DL data is received or not to the network and a second TTI in which the communication device receives a first DL assignment from the network, and the second HARQ minimum timing is a second interval between a third TTI in which the communication device transmits a second HARQ feedback indicating whether second DL data is received or not to the network and a fourth TTI in which the communication device receives a second DL assignment from the network.

6. A method for handling a Hybrid Automatic Repeat Request (HARQ) timing for a communication device of a base station (BS) comprised in a network, comprising:

communicating with the communication device according to a first HARQ minimum timing;

receiving a first message comprising an indication of support of a second HARQ minimum timing from the communication device according to the first HARQ minimum timing, wherein the first HARQ minimum timing is greater than the second HARQ minimum timing;

transmitting a second message configuring the second HARQ minimum timing to the communication device according to the first HARQ minimum timing in response to the first message; and communicating with the communication device according to the second HARQ minimum timing, when configuring the second HARQ minimum timing to the communication device.

7. The method of claim 6, wherein the first HARQ minimum timing is a first interval between a first transmission time interval (TTI) in which the communication device receives a first uplink (UL) grant from the network and a second TTI in which the communication device transmits first UL data according to the first UL grant to the network, and the second HARQ minimum timing is a second interval between a third TTI in which the communication device receives a second UL grant from the network and a fourth TTI in which the communication device transmits second UL data according to the second UL grant to the network.

8. The method of claim 6, wherein the first HARQ minimum timing is a first interval between a first TTI in which the communication device transmits first UL data according to a first HARQ process and a first UL grant to the network and a second TTI in which the communication device receives a first HARQ feedback indicating whether the first UL data is received or not or in which the communication device receives a second UL grant from the network, and the second HARQ minimum timing is a second interval between a third TTI in which the communication device transmits second UL data according to a second HARQ process and a third UL grant to the network and a fourth TTI in which the communication device receives a second HARQ feedback indicating whether the second UL data is received or not or in which the communication device receives a fourth UL grant from the network.

9. The method of claim 6, wherein the first HARQ minimum timing is a first interval between a first TTI in which the communication device intends to receive first downlink (DL) data according to a first DL assignment from the network and a second TTI in which the communication device transmits a first HARQ feedback indicating whether the first DL data is received or not to the network, and the second HARQ minimum timing is a second interval between a third TTI in which the communication device intends to receive second DL data according to a second DL assignment from the network and a fourth TTI in which the communication device transmits a second HARQ feedback indicating whether the second DL data is received or not to the network.

10. The method of claim 6, wherein the first HARQ minimum timing is a first interval between a first TTI in which the communication device transmits a first HARQ feedback indicating whether first DL data is received or not to the network and a second TTI in which the communication device receives a first DL assignment from the network, and the second HARQ minimum timing is a second interval between a third TTI in which the communication device transmits a second HARQ feedback indicating whether second DL data is received or not to the network and a fourth TTI in which the communication device receives a second DL assignment from the network.

\* \* \* \* \*